F. CONRAD.
TRANSFORMER FOR USE WITH CURRENT RECTIFYING APPARATUS.
APPLICATION FILED APR. 10, 1908.

1,123,248.

Patented Jan. 5, 1915.

WITNESSES:
C. L. Belcher
Otto S. Schairer

INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

TRANSFORMER FOR USE WITH CURRENT-RECTIFYING APPARATUS.

1,123,248.  Specification of Letters Patent.  Patented Jan. 5, 1915.

Application filed April 10, 1908. Serial No. 426,311.

*To all whom it may concern:*

Be it known that I, FRANK CONRAD, a citizen of the United States, and a resident of Swissvale, in the county of Allegheny and State of Pennsylvania, have invented a new and useful Improvement in Transformers for Use with Current-Rectifying Apparatus, of which the following is a specification.

My invention relates to current-rectifying apparatus, and particularly to transformers that constitute a part of such apparatus.

The object of the invention is to provide a transformer of such structure and arrangement of parts that all other auxiliary devices may be dispensed with and regulation of the operation of the rectifier readily effected.

In order to sustain the uni-directional current derived from a vapor-rectifying device, it is usually necessary to provide a suitable amount of inductance in the direct current circuit, and in order to prevent small fluctuations of voltage from effecting large variations in the amount of current traversing the rectifying device, it is also usually necessary to either introduce a suitable amount of ohmic resistance into the direct current circuit or inductance into the alternating current circuit. The functions above specified have commonly been performed by separate devices, but in Patent No. 931,114 I have proposed to so construct and arrange the parts of a transformer as to avoid the necessity of employing other auxiliary devices. However, the transformer there specifically shown and described is not well adapted for use when the desired ratio of the primary to the secondary voltage is approximately one to one, because there would, in that case, be no separate or distinct paths for the primary and secondary leakage fluxes. In the present application, it is the specific object to provide a transformer adapted for use when the ratio of transformation is approximately one to one.

Figure 1:
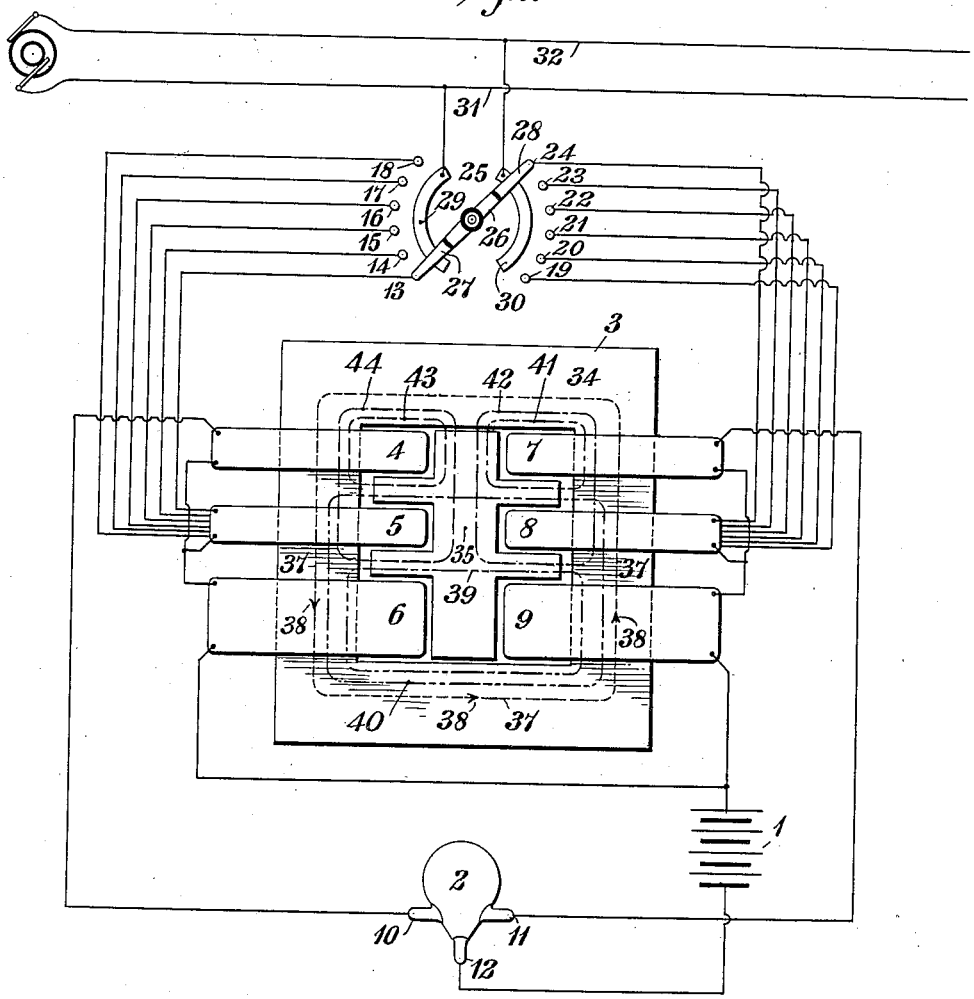
Figure 2:
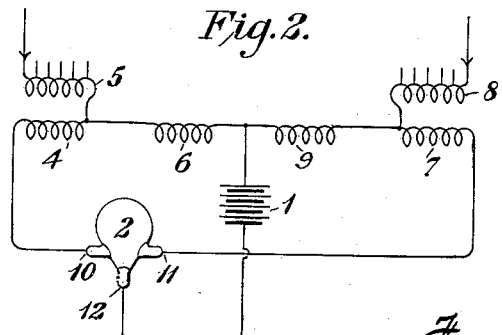

Figure 1 of the accompanying drawing is a diagrammatic view of a rectifying system embodying the invention, and Fig. 2 is a simplified diagram of the same system.

A storage battery 1, of any desired number of cells, is supplied with the charging current from current-rectifying apparatus comprising a mercury-vapor or similar rectifying device 2 and a transformer 3. The transformer comprises six coils 4, 5, 6, 7, 8, and 9, of which the coils 4, 6, 7, and 9 constitute the secondary circuit, the said coils being connected in series and between alternating current terminals 10 and 11 of the current-rectifying device. The middle or other suitable intermediate point of the secondary winding is connected to one terminal of the battery 1, and the other terminal of the battery is connected to negative or direct current terminal 12 of the rectifying device. One terminal of the coil 5 is connected to the connections between the coils 4 and 6 and one terminal of the coil 8 is connected to the connection between the coils 7 and 9, the said coils 5 and 8 being subdivided by means of a suitable number of leads that are connected, respectively, to stationary contact terminals 13 to 24, inclusive, of a regulating device 25. The regulating devices 25 comprises further, a movable arm 26 carrying conducting members 27 and 28 adapted to engage the said contact terminals, as well as conducting segments 29 and 30 that are disposed adjacent thereto and are connected to circuit conductors 31 and 32. The coils 5, 6, 9, and 8 therefore constitute the primary circuit of the transformer, and its active length may be varied by adjusting the position of the arm 26, the coils 6 and 9 being common to both the primary and secondary circuits.

The magnetizable core of the transformer 3 comprises a rectangular portion 34 upon opposite sides or legs of which the coils 4 to 9, inclusive, are mounted, three coils surrounding each leg, and an auxiliary central portion or leg 35 extending, between the coils, from top to bottom and from side to side of the main core portion 34, airgaps of suitable width being provided between the abutting edges of the core portions. The auxiliary core portion 35 provides, between the coils, leakage paths of relatively low and suitable reluctance and such that the coils of the primary winding, or a part thereof, will be surrounded by a leakage flux that does not also surround all of the coils of the secondary winding and, further, such that the secondary winding, or a part thereof, will be surrounded by a leakage flux that does not also surround the primary winding. The effect of the former flux is to cause the desired drop of potential in the system and the effect of the latter is to sustain the rectified current. The arrangement of the coils and core parts with respect to each other is, in addition, such that, in making changes in the active length of the primary winding, i. e., changes in the voltage applied to the direct current circuit, the distribution and amounts of the leakage fluxes will be so affected as to cause the leakage volts per turn of the winding surrounding the primary leakage flux to vary in substantially the same ratio as the primary and secondary volts per turn, with the result that the power factor of the rectifying apparatus remains approximately uniform under all conditions of operation. In order also, that the amounts of current supplied to the battery may vary through substantially the same range for each step of the regulator, it is desirable that the drop of potential in the system remain an approximately constant per cent. of the secondary voltage, and in order that the minimum limiting value of the direct current at which the rectifying operation will continue may be approximately the same for each step of the regulator, i. e., in order that the sustaining effect may remain approximately constant, it is desirable that the leakage flux which serves to sustain the rectified current should vary approximately in proportion to variations in the secondary voltage of the transformer. The structure and arrangement of the parts of the transformer, as shown, are further such as to secure these results.

When beginning the charging operation, the connections should be arranged to produce a low secondary voltage, because of the low voltage of the battery in its uncharged condition, and, accordingly, the regulator arm 26 should occupy the position indicated, providing, of course, that the battery comprises the minimum number of cells which the apparatus is adapted to charge. The primary circuit then comprises all of the convolutions contained in coils 5, 6, 8, and 9, and, for purposes of illustration, it may be assumed that, under this condition, the convolutions in the primary and secondary circuits are equal in number. The main flux produced by the primary coils traverses a path indicated by the broken line 37, its direction during a given half cycle being indicated by the pointers 38. The secondary flux opposes the main primary flux and, by reason of the relatively low reluctances of the leakage paths provided by the core portion 35, as well as by reason of the fact that the primary coils 5 and 8 are not also included in the secondary circuit, primary leakage fluxes that do not surround the whole of the secondary winding are caused to traverse paths indicated by the broken lines 39 and 40. These leakage fluxes have the same effect as the presence of inductive resistance between the transformer and the supply circuit, or of the presence of ohmic resistance in the direct current circuit, i. e., of causing a drop of potential in the system for regulating purposes. These leakage fluxes, however, do not have any sustaining effect upon the rectified current, since they simply serve to shift the phase of the alternating current with respect to the electromotive force. By reason of the opposition of the primary and secondary fluxes and also because the primary and secondary circuits are not completely coincident, secondary leakage fluxes are also caused to traverse the relatively low reluctance paths provided by the core portion 35, the said paths being indicated during one half cycle of the alternating current by the lines 41 and 42, and during the other half cycle by the lines 43 and 44. The leakage fluxes indicated by the lines 41 and 42 are produced by the coil 7 and those indicated by the lines 43 and 44 are produced by the coil 4. It will be observed that the secondary leakage fluxes traverse the central portion of the core part 35 in the same direction for each half cycle of the alternating current. There is, therefore, no necessity of reversing the magnetism, or of fully re-magnetizing the said portion of the magnetic circuit, with the result that the increase of current in each half of the secondary winding will be but slightly delayed. On the other hand, the decrease of current in each half of the secondary winding is considerably delayed by reason of the energy previously stored thereby in the portions of the magnetic circuit that are traversed by the secondary leakage fluxes, with the result that the uni-directional or rectified currents, that are derived from the respective halves of the secondary winding during successive half cycles of the alternating current, overlap. The secondary leakage flux, therefore, has the same effect as the presence of inductive resistance in the direct current circuit, i. e., of sustaining the direct or rectified current or of preventing it from falling below a definite or predetermined value. The leakage fluxes indicated by the lines 41 to 44, inclusive, have no effect in causing a drop of potential in the system, because the direction of the said fluxes in the core portion 35 does not change. It will be observed that since a portion of the coils of the transformer are common to both the primary and secondary circuits and the remaining coils belong to the one or the other of said circuits, primary and secondary leakage fluxes that traverse distinctive paths are permitted which, in turn, permit of obtaining the desired regulating and sustaining effects within the transformer, even though the ratio of transformation is substantially one to one. The leakage fluxes indicated by the lines 41 to 44, inclusive, have no effect in causing a drop of potential in the system, because the direction of the said fluxes in the core portion 35 does not change. As the battery becomes charged, its voltage increases and the amount of charging current accordingly decreases. When the current delivered to the battery has decreased to a predetermined value, the sustaining effect afforded by the leakage fluxes indicated by the lines 41 to 44, inclusive, becomes insufficient to sustain the rectified current, and the rectifying process, therefore, is interrupted. If the battery is not, at that time, fully charged, the regulator arm 26 should be moved another step in a clockwise direction for the purpose of removing portions of the coils 5 and 8 from the primary circuit of the transformer, which, in turn, serves to increase the voltage applied to the secondary circuit. In general, the mode of operation remains as previously described, though, upon removing portions of the coils 5 and 8 from the primary circuit of the transformer, a greater amount of primary leakage flux is caused to traverse the path indicated by the line 39 and a smaller amount to traverse the path indicated by the line 40, while the total amount of leakage is increased. The changes in the amount and distribution of the leakage fluxes is such that the leakage volts per turn of the winding surrounding the primary leakage flux change substantially in direct proportion to the change in the primary and secondary volts per turn, and also such that the change in the sustaining effect afforded by the fluxes indicated by the lines 41 to 44, inclusive, is substantially proportional to the change in the secondary voltage. The power factor of the apparatus, therefore, remains substantially the same as before the movement of the regulator arm and the rectifying operation will continue until the rectified current has decreased to substantially the same value as that at which the operation ceased before movement of the regulator arm. Since the drop of potential in the system is proportional to the product of the primary leakage flux and the number of turns of the winding surrounding the leakage flux, this result would not occur, if the distribution of the leakage flux were not altered at the same time it is changed in amount, or at the same time that the secondary voltage is changed. If the battery cannot be fully charged with the conducting members 27 and 28 in engagement with contact terminals 14 and 23, respectively, the regulator arm should be moved step by step in a clockwise direction until the desired degree of charge is obtained. In continuing the movement of the regulator arm in a clockwise direction, the total amount of primary leakage flux increases and more of the flux indicated by the line 40 is gradually diverted into the path indicated by the line 39, with the result that the conditions above described continue to prevail.

The range of direct current voltages obtainable from the apparatus is such, or may be such in practice, as to adapt it to fully charge a storage battery the voltage of which may change considerably from no-charge to fully charged condition, or to adapt it for use in the charging of batteries comprising considerably different numbers of cells.

While the invention is primarily intended for use in connection with the charging of storage batteries, it is not limited to such use, but is equally applicable in connection with apparatus employed for other purposes.

I claim as my invention:

1. A transformer comprising a magnetizable core having two legs, and a plurality of coils upon each leg, those occupying the extreme positions being connected in series and those occupying intermediate positions being subdivided and connected to the common connections of the coils between which they are located.

2. A transformer comprising a magnetizable core having two legs, and a plurality of coils upon each leg, those occupying extreme positions being connected in series and those occupying intermediate positions being subdivided and connected to the common connections of the coils between which they are located, in combination with means for adjusting the points of connections to the subdivided coils.

3. A transformer comprising a magnetizable core having two legs, a plurality of coils upon each leg, those occupying the extreme positions being connected in series and those occupying intermediate positions being subdivided and connected to the common connections of the coils between which they are located, and means providing leakage paths between the coils.

4. A transformer comprising a magnetizable core having two legs, and a plurality of coils upon each leg, those occupying the extreme positions being connected in series and those occupying intermediate positions being subdivided and connected to the common connections of the coils between which they are located, the subdivided coils and those at the extremities of the series comprising approximately the same number of convolutions.

5. A transformer comprising two pairs of series-connected coils, and two other coils each of which is symmetrically disposed between two of the series-connected coils and has a terminal connected to the adjacent terminals of the coils between which it is located.

6. A transformer comprising a magnetizable core, a plurality of series-connected coils, other coils connected to the common connections of coils of the said series, and means providing leakage paths between the coils.

7. A transformer comprising a magnetizable core, a plurality of series-connected coils, other coils connected to the common connections of coils of the said series, certain of said coils being subdivided, and means providing leakage paths between the coils and arranged to cause variation in the distribution of the leakage fluxes when adjustment of the points of connection to the subdivided coils is effected.

8. A transformer comprising a magnetizable core having two legs, a plurality of coils upon each leg, those occupying the extreme positions being connected in series and those occupying intermediate positions being sub-divided and connected to the common connections of the coils between which they are located, and means providing a relatively low reluctance leakage path around each of the coils.

9. A transformer comprising a magnetizable core having two legs and yoke portions, a plurality of coils upon each leg, those occupying the extreme position being connected in series and those occupying intermediate positions being sub-divided and connected to the common connections of the coils between which they are located, and magnetizable material interposed between the coils and extending adjacent to the yoke and leg portions of the core.

In testimony whereof, I have hereunto subscribed my name this 27th day of March, 1908.

FRANK CONRAD.

Witnesses:
R. B. INGRAM,
BIRNEY HINES.